United States Patent
Cho

(10) Patent No.: US 12,156,107 B2
(45) Date of Patent: Nov. 26, 2024

(54) APPARATUS, SYSTEM, AND METHOD FOR CONTROLLING ON/OFF OF A VEHICLE STATE NOTIFICATION SERVICE

(71) Applicants: HYUNDAI MOTOR COMPANY, Seoul (KR); KIA CORPORATION, Seoul (KR)

(72) Inventor: Yong Sik Cho, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 547 days.

(21) Appl. No.: 17/516,320

(22) Filed: Nov. 1, 2021

(65) Prior Publication Data

US 2022/0201445 A1    Jun. 23, 2022

(30) Foreign Application Priority Data

Dec. 22, 2020  (KR) .......................... 10-2020-0181033

(51) Int. Cl.
*H04W 4/44* (2018.01)
*H04W 4/029* (2018.01)

(52) U.S. Cl.
CPC ............. *H04W 4/44* (2018.02); *H04W 4/029* (2018.02)

(58) Field of Classification Search
None
See application file for complete search history.

(56) References Cited

U.S. PATENT DOCUMENTS

2016/0214535 A1* 7/2016 Penilla .................... B60L 53/68
2021/0403062 A1* 12/2021 Bramucci ............. B61L 23/041

FOREIGN PATENT DOCUMENTS

WO    WO-2019093032 A1 * 5/2019    ......... G01C 21/3415

* cited by examiner

*Primary Examiner* — Adolf Dsouza
(74) *Attorney, Agent, or Firm* — Lempia Summerfield Katz LLC

(57) ABSTRACT

An apparatus for switching on and off a service for informing a user of a vehicle state through a communication terminal, a system including the same, and a method thereof are disclosed. The apparatus, system, and method can acquire a location of a vehicle, to which a notification service on a state of the vehicle is provided through a communication terminal of a user, and control on/off of the notification service, based on at least one of information on the location of the vehicle, an area, in which the notification service is unnecessary, or information on driving patterns of the user. Usability may be improved by classifying an area, in which a notification is unnecessary, according to attributes of notification information on the state of the vehicle to prevent generation of an unnecessary notification in advance.

20 Claims, 7 Drawing Sheets

APPARATUS, SYSTEM, AND METHOD FOR CONTROLLING ON/OFF OF A VEHICLE STATE NOTIFICATION SERVICE

CROSS-REFERENCE TO RELATED APPLICATION

This application claims the benefit of priority to Korean Patent Application No. 10-2020-0181033, filed in the Korean Intellectual Property Office on Dec. 22, 2020, the entire contents of which are incorporated herein by reference.

TECHNICAL FIELD

The present disclosure relates to an apparatus for controlling on/off of a vehicle state notification service, a system including the same, and a method thereof. More particularly, the present disclosure relates to an apparatus for switching on and off a service for informing a user of a vehicle state through a communication terminal, to a system including the same, and to a method thereof.

BACKGROUND

A connected car service for transmitting information on a state of a vehicle to a server in real time through a communication network has been developed and used. Through the connected card service, a customer may receive a notification on the state of the vehicle through an application of a smartphone. Through the connected car service, a notification of detection of an impact on a vehicle, a notification of a startup state, a notification of idling of the vehicle, and a notification of opening of a door may be delivered to a customer in real time.

The connected car services have been expanded and the kinds of notification services have gradually increased. However, the fatigue of customers who receive notifications may increase and inconvenience may be caused when notifications are generated excessively or frequently while the situations of the customers are not considered even in situations in which no notification is necessary.

SUMMARY

Accordingly, it is necessary to develop technologies that may improve address or reduce the inconvenience. The present disclosure has been made to solve the above-mentioned problems occurring in the prior art while advantages achieved by the prior art are maintained intact.

An aspect of the present disclosure provides an apparatus for improving usability by classifying an area, in which a notification is unnecessary, according to attributes of notification information of a vehicle state notification service. Thus, generation of an unnecessary notification in advance may be prevented. Other aspects of the present disclosure provide a system including the same and a method thereof.

Another aspect of the present disclosure provides an apparatus for preventing inconvenience due to a notification generated unintentionally by analyzing a driving pattern of a user, estimating a proper notification indication time point and a proper condition, and providing notification information accumulated at the proper notification indication time point. Other aspects of the present disclosure provide a system including the same and a method thereof.

Another aspect of the present disclosure provides an apparatus for preventing disputes between a customer and a repair service provider due to indication of impact information, idling information, and the like of a vehicle, which are generated during a repair operation for the vehicle. Other aspects of the present disclosure provide a system including the same and a method thereof.

Another aspect of the present disclosure provides an apparatus for preventing disputes between a customer and a parking service provider due to indication of a notification of detection of an impact, which are generated while a parking elevator moves after a vehicle is parked in a parking tower. Other aspects of the present disclosure provide a system including the same and a method thereof.

The technical problems to be solved by the present inventive concept are not limited to the aforementioned problems. Any other technical problems not mentioned herein should be clearly understood from the following description by those having ordinary skill in the art to which the present disclosure pertains.

According to an aspect of the present disclosure, an apparatus for controlling on/off of a vehicle state notification service includes a sensor that acquires a location of a vehicle, to which a notification service for a state of the vehicle is provided through a communication terminal of a user. The apparatus for controlling on/off of a vehicle state notification service also includes a controller that controls on/off of the notification service, based on at least one of the location of the vehicle, information on an area, in which the notification service is unnecessary, and information on a driving pattern of the user.

According to an embodiment, the apparatus may further include an input device, to which a destination of the vehicle is input. The controller may notify the user that the notification service is automatically switched off after the vehicle reaches the destination when the destination corresponds to an area, in which preset notification service is unnecessary.

According to an embodiment, the area, in which the notification service is unnecessary, may be at least one of a vehicle repair shop or a parking tower. The notification service may include at least one of a notification of idling, a notification of detection of an impact, a notification of a passenger on a rear seat, or a notification of opening of a door.

According to an embodiment, the controller may switch off the notification service when the location of the vehicle corresponding to the area, in which the notification service is unnecessary, after the vehicle reaches the destination.

According to an embodiment, the apparatus may further include a communication device that performs communication with a server. The controller may transmit a notification indicating that notification service is switched off to the server through the communication device when the notification service is switched off.

According to an embodiment, the controller may switch on the notification service, based on whether a second destination corresponds to the area, in which the notification service is necessary, when the user sets the second destination and restarts the vehicle, after switching off the notification service as the location of the vehicle corresponds to the area, in which the notification service is unnecessary.

According to an embodiment, the controller may switch on the notification service in correspondence to whether the notification service input from the user is to be switched on or off when the user does not set a second destination and restarts the vehicle, after switching off the notification service as the location of the vehicle corresponds to the area, in which the notification service is unnecessary.

According to an embodiment, the controller may determine a first time point, at which the notification service is to be switched off, based on the location of the vehicle and the driving pattern, and switch off the notification service at the first time point.

According to an embodiment, the controller may determine a second time point, at which notifications accumulated while the notification service is off are to be provided to at least one of the user and a server, based on the location of the vehicle and the driving pattern. The controller may also provide the notifications accumulated while the notification service is off to the at least one of the user or the server at the second time point.

According to an embodiment, the controller may determine at least one of the first time point and the second time point, based on a commuting or returning-home condition of the user, which is determined according to the location of the vehicle and the driving pattern.

According to an embodiment, the controller may switch off the notification service, based on a condition for activating a valet parking mode of the vehicle, and provide notifications accumulated while the notification service is off to at least one of the user and a server, based on a condition for releasing the valet parking mode of the vehicle.

According to an embodiment, the controller may determine a situation, in which a driver waits for a customer, based on a condition, in which the vehicle stands by in an idling state in a specific area. The specific area is determined according to the location of the vehicle and the driving pattern. The controller may also switch off the notification service of notifying the driver of idling of the vehicle.

According to another aspect of the present disclosure, a system for controlling on/off of a vehicle state notification service includes a server that receives a state of a vehicle that provides a notification service from the vehicle and that transmits a notification on the state of the vehicle to a communication terminal of a user. The system for controlling on/off of a vehicle state notification service also includes an apparatus for controlling on/off of the notification service. The apparatus acquires a location of the vehicle and controls on/off of the notification service, based on at least one of the location of the vehicle, information on an area, in which the notification service is unnecessary, or information on a driving pattern of the user.

According to an embodiment, the apparatus for controlling on/off of the vehicle state notification service may switch off the notification service and transmit a notification indicating that the notification service is switched off, to the server, when the location of the vehicle corresponds to the area, in which the notification service is unnecessary. The server may transmit the notification indicating that the notification service is switched off, to the communication terminal.

According to another aspect of the present disclosure, a method for controlling on/off of a vehicle state notification service includes acquiring a location of a vehicle, to which a notification service for a state of the vehicle is provided through a communication terminal of a user. The method for controlling on/off of a vehicle state notification service also includes controlling on/off of the notification service, based on at least one of the location of the vehicle, information on an area, in which the notification service is unnecessary, and information on a driving pattern of the user.

According to an embodiment, the method may further include inputting a destination of the vehicle and notifying the user that the notification service is automatically switched off after the vehicle reaches the destination when the destination corresponds to an area, in which preset notification service is unnecessary.

According to an embodiment, the controlling on/off of the notification service, based on at least one of the location of the vehicle, information on the area, in which the notification is unnecessary, or information on the driving pattern of the user may include switching off the notification service when the location of the vehicle corresponding to the area, in which the notification service is unnecessary, after the vehicle reaches the destination.

According to an embodiment, the method may further include switching on the notification service based on whether a second destination corresponds to the area, in which the notification service is necessary, when the user sets the second destination and restarts the vehicle, after switching off the notification service as the location of the vehicle corresponds to the area, in which the notification service is unnecessary. The method may further include switching on the notification service in correspondence to whether the notification service input from the user is to be switched on or off when the user does not set the second destination and restarts the vehicle, after switching off the notification service as the location of the vehicle corresponds to the area, in which the notification service is unnecessary.

According to an embodiment, the controlling on/off of the notification service, based on at least one of the location of the vehicle, information on the area, in which the notification service is unnecessary, or information on the driving pattern of the user may include determining a first time point, at which the notification service is to be switched off, based on the location of the vehicle and the driving pattern, and switching off the notification service at the first time point. The controlling on/off of the notification service may also include determining a second time point, at which notifications accumulated while the notification service is off are to be provided, based on the location of the vehicle and the driving pattern, and providing the notifications accumulated while the notification service is off to the user at the second time point.

According to an embodiment, the determining of the first time point, at which the notification service is to be switched off, based on the location of the vehicle and the driving pattern, and switching off the notification service at the first time point may include determining the first time point, based on a commuting or returning-home condition of the user, which is determined according to the location of the vehicle and the driving pattern. Further, the determining of the second time point, at which the notifications accumulated while the notification service is off are to be provided, based on the location of the vehicle and the driving pattern, and providing the notifications accumulated while the notification service is off to the user at the second time point may include determining the second time point, based on the commuting or returning-home condition of the user, which is determined according to the location of the vehicle and the driving pattern.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
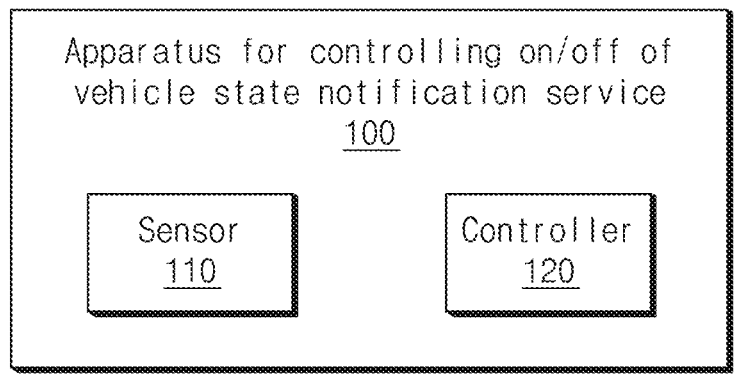
FIG. 1 is a block diagram illustrating an apparatus for controlling on/off of a vehicle state notification service according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function has been omitted where it has been determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components. The terms do not limit the nature, order or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to FIGS. 1-6.

FIG. 1 is a block diagram illustrating an apparatus for controlling on/off of a vehicle state notification service according to an embodiment of the present disclosure.

Referring to FIG. 1, an apparatus 100 for controlling on/off of a vehicle state notification service may be implemented to include a sensor 110 and a controller 120.

The apparatus 100 for controlling on/off of a vehicle state notification service may be integrally provided with a vehicle. In another embodiment, the apparatus 100 may be implemented to be installed in or attached to the vehicle as a separate configuration from the vehicle. In another embodiment, a portion of the apparatus 100 may be integrally implemented and the other portions of the apparatus 100 may be installed in or attached to the vehicle as separate configurations.

The vehicle provided with the apparatus 100 for controlling on/off of a vehicle state notification service may provide a notification service on a state of the vehicle through a communication terminal of a user.

The sensor 110 may acquire a location of the vehicle.

As an example, the sensor 110 may acquire the location of the vehicle through a global positioning system (GPS).

As an example, the sensor 110 may be directly or indirectly connected to the controller 120 through wireless or wired communication and may deliver the sensed information to the controller 120.

The controller 120 may perform an overall control such that the elements may normally perform their functions. The controller 120 may be implemented in a form of hardware, may be implemented in a form of software, or may be implemented in a form of a combination of hardware and software. In an embodiment, the controller 120 may be implemented by a microprocessor, but the present disclosure is not limited thereto. Furthermore, the controller 120 may perform various data processing and calculations, which is described below.

The controller 120 may control on/off of the notification service, based on at least one of the location of the vehicle, information on an area, in which the notification is unnecessary, or information on a driving pattern of a user.

As an example, the controller 120 may control the system for providing a vehicle state notification service such that the notification service that notifies the user of the state of the vehicle through the communication terminal of the user is activated when the notification service of the vehicle is switched on.

As an example, the controller 120 may control the system for providing a vehicle state notification service such that the notification service that notifies the user of the state of the vehicle through the communication terminal is deactivated and a notification is not delivered to the communication terminal of the user when the notification service of the vehicle is switched off.

As an example, the controller 120 may recognize information on an area, in which the notification service is unnecessary, through a navigation system of the vehicle including a map database (DB), defining the area, in which the notification service is unnecessary. The controller 120 may control on/off of the notification service by using the recognized information.

As an example, when notifications corresponding to a plurality of kinds are included in the notification service, the controller 120 may control on/off of the notification service for some notifications in the process of controlling the on/off of the notification service.

As an example, the controller 120 may control the on/off of the notification service, based on whether the location of the vehicle is included in the area, in which the notification service is unnecessary.

As an example, the notification service may include at least one of a notification of idling, a notification of detection of an impact, a notification of a passenger on a rear seat, or a notification of opening of a door.

As an example, the area, in which the notification service is unnecessary, may be at least one of a vehicle repair shop or a parking tower.

Through this, the apparatus 100 for controlling on/off of a vehicle state notification service may prevent an unnecessary notification by automatically switching off the vehicle state notification service, including a notification of idling, a notification of detection of an impact, a notification of a passenger on a rear seat, and the like, which may occur during a repair operation, when the user leaves the vehicle to a vehicle repair shop for repair of the vehicle.

Furthermore, the apparatus 100 for controlling on/off of a vehicle state notification service may prevent an unnecessary notification by automatically switching off the vehicle state notification service, including a notification of detection of an impact, in consideration of an impact due to movement of a parking power when the user parks the vehicle in the parking tower.

As an example, the controller 120 may calculate an area or a condition, in which the notification service is determined to be unnecessary, by analyzing the driving pattern of the user.

As an example, the controller 120 may calculate a time point, at which notifications accumulated while the notification service is off are to be provided, by analyzing the driving pattern of the user.

As an example, the controller 120 may recognize the driving pattern of the user through an audio video navigation (AVN) or navigation system and may analyze the driving pattern.

The controller 120 may switch off the notification service, based on a condition for activating a valet packing mode of the vehicle.

As an example, the controller 120 may switch off the notification service by identifying that the valet parking mode is activated, based on whether the valet parking mode is input through the AVN of the vehicle.

The controller 120 may provide the notifications, accumulated while the notification service is off, to at least one of the user or the server, based on a condition for releasing the valet parking mode of the vehicle.

As an example, the controller 120 may identify that the valet parking mode is released, based on whether a release of the valet parking mode is input, through the AVN of the vehicle. The controller 120 may provide the notifications, accumulated while the notification service is off, to at least one of the user or the server.

The controller 120 may determine a situation, in which the driver waits for a customer, based on a condition, in which the vehicle stands by while idling in a specific area, which is determined according to the location of the vehicle and the driving pattern. The controller 120 may switch off the notification service indicating idling of the vehicle.

As an example, the controller 120 may set a condition, in which the vehicle stands by while idling in a specific area, when the user repeats the idling/standby state in the specific area in similar patterns. The controller 120 may switch off the notification service indicating the idling of the vehicle by determining the situation in which the driver waits for a customer, when the condition, in which the vehicle stands by while idling in the specific area, is satisfied.

Figure 2:
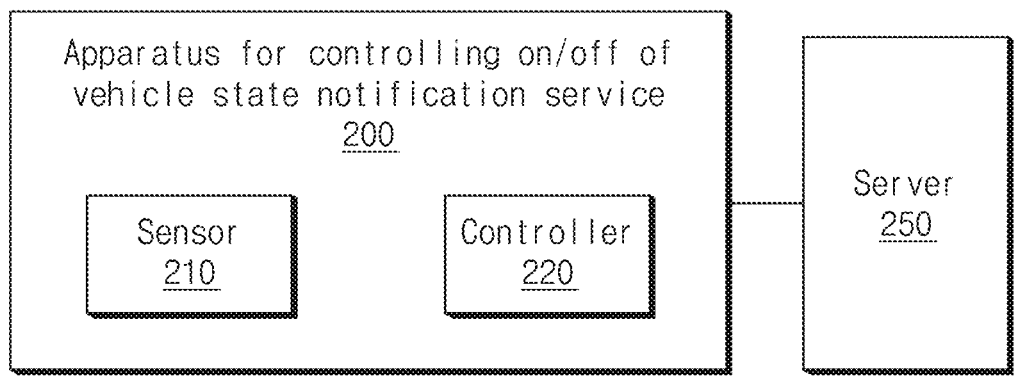
FIG. 2 is a view illustrating a system for controlling on/off of a vehicle state notification service according to an embodiment of the present disclosure.

FIG. 2 is a view illustrating a system for controlling on/off of a vehicle state notification service according to an embodiment of the present disclosure.

Referring to FIG. 2, a system for controlling on/off of a vehicle state notification service may include an apparatus 200 for controlling on/off of a vehicle state notification service and a server 250.

The apparatus 200 for controlling on/off of a vehicle state notification service may include a sensor 210 and a controller 220.

The apparatus 200 for controlling on/off of a vehicle state notification service may acquire a location of a vehicle through the sensor 210 and may control on/off of the notification service through the controller 220, based on at least one of the location of the vehicle, information on an area, in which the notification service is unnecessary, or information on a driving pattern of a user.

The apparatus 200 for controlling on/off of a vehicle state notification service may be connected to the server through wireless communication to transmit and receive information.

The apparatus 200 for controlling on/off of a vehicle state notification service may switch off the notification service and transmit a notification, indicating that the notification service is switched off, to the server 250 when the location of the vehicle corresponds to the area, in which the notification service is unnecessary.

The server 250 may provide a notification service, indicating information on the state of the vehicle, to the user by using a communication network.

As an example, the server 250 may receive the state of the vehicle from the vehicle that provides the notification service and may transmit the notification on the state of the vehicle to a communication terminal of a user.

As an example, the server 250 may include a server that manages the vehicle state notification service.

The server 250 may transmit a notification, indicating that the notification service is switched off, to the communication terminal.

As an example, the server 250 may transmit a notification of contents, indicating that the vehicle state notification service is switched off, to the communication terminal including a smartphone of the user.

As another example, the apparatus 200 for controlling on/off of a vehicle state notification service may transmit a notification, indicating that the notification service is switched on, to the server when the notification service is switched on. The server 250 may transmit a notification indicating that the notification service is switched on, to the communication terminal of the user.

Figure 3:
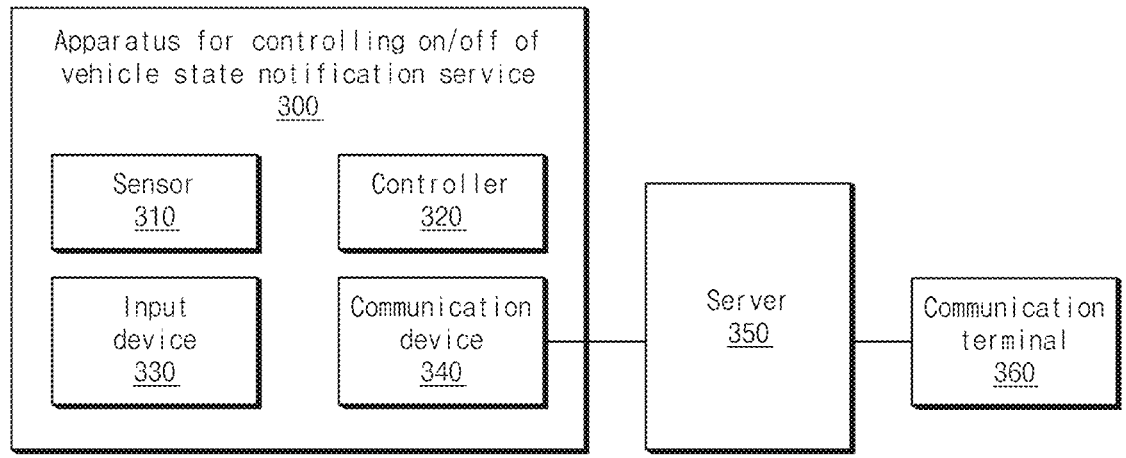
FIG. 3 is a view illustrating an apparatus and a system for controlling on/off of a vehicle state notification service according to an embodiment of the present disclosure in detail.

FIG. 3 is a view illustrating an apparatus and a system for controlling on/off of a vehicle state notification service according to an embodiment of the present disclosure in detail.

Referring to FIG. 3, a system for controlling on/off of a vehicle state notification service may include an apparatus 300 for controlling on/off of a vehicle state notification service, a server 350, and a communication terminal 360.

The apparatus 300 for controlling on/off of a vehicle state notification service may include a sensor 310, a controller 320, an input device 330, and a communication device 340.

The apparatus 300 for controlling on/off of a vehicle state notification service may acquire a location of a vehicle through the sensor 310 and may control on/off of the notification service through the controller 320, based on at least one of the location of the vehicle, information on an area, in which the notification service is unnecessary, or information on a driving pattern of a user.

The apparatus 300 for controlling on/off of a vehicle state notification service may switch off the notification service through the controller 320 and transmit a notification, indicating that the notification service is switched off, to the server 350 through the communication device 340, when the location of the vehicle corresponds to the area, in which the notification service is unnecessary.

The controller 320 may control on/off of the notification service, based on at least one of the location of the vehicle, information on an area, in which the notification service is unnecessary, or information on a driving pattern of a user.

As an example, the controller 320 may inform the user that the notification service is automatically switched off after the vehicle reaches the destination when the destination corresponds to the area, in which the notification service is unnecessary.

As an example, the controller 320 may inform the user that the notification service is automatically switched off after the vehicle reaches the destination by providing a popup notification through the AVN or cluster of the vehicle.

The controller 320 may switch off the notification service when the location of the vehicle corresponds to the area, in which the notification service is unnecessary, after the vehicle reaches the destination.

The controller 320 may transmit a notification, indicating that the notification service is switched off, to the server 350 through the communication device 340 when the notification service is switched off.

The input device 330 may receive a destination from the user.

As an example, the input device 330 may include an AVN or navigation system that receives a destination of the vehicle.

The communication device 340 may perform communication with the server 350.

As an example, the communication device 340 may transmit a notification, indicating that the notification service is switched off, to the server 350 when the notification service is switched off.

As an example, the communication device 340 may communicate with the server 350, by using at least one of Wi-Fi, Bluetooth, ZigBee, an ultra-wide band (UWB) communication, or a near field communication (NFC).

The server 350 may receive the state of the vehicle from the vehicle that provides the notification service and may transmit the notification on the state of the vehicle to the communication terminal 360 of a user.

The server 350 may transmit a notification, indicating that the notification service is switched off, to the communication terminal 360.

The communication terminal 360 may output a notification through a popup of an application that interworks with a connected car system such that the user may identify the notification.

Figure 4A:
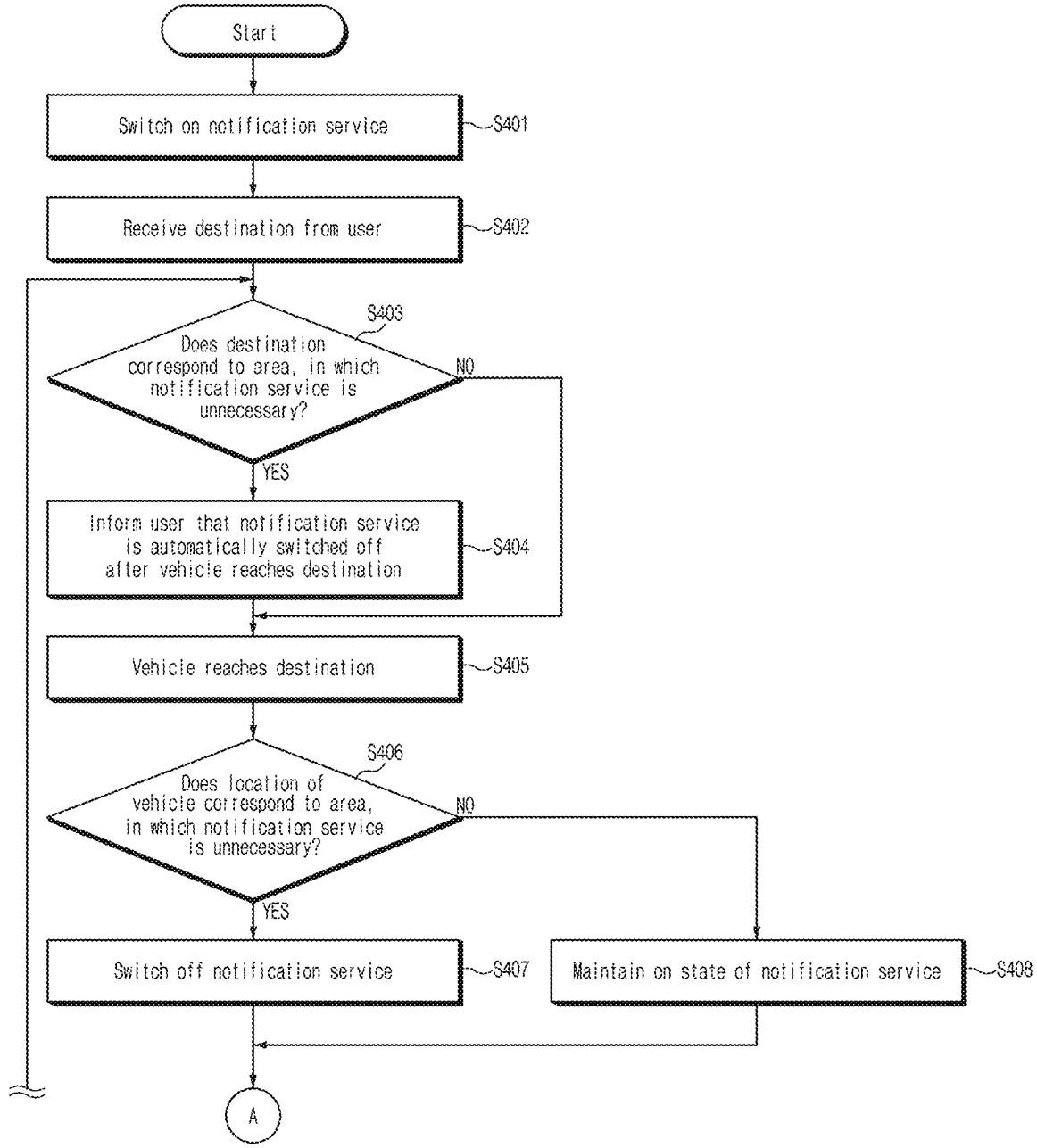
FIGS. 4A and 4B illustrate a flowchart illustrating a process of controlling on/off of a vehicle state notification service, based on area information, by an apparatus for controlling on/off of a vehicle state notification service according to an embodiment of the present disclosure.
Figure 4B:
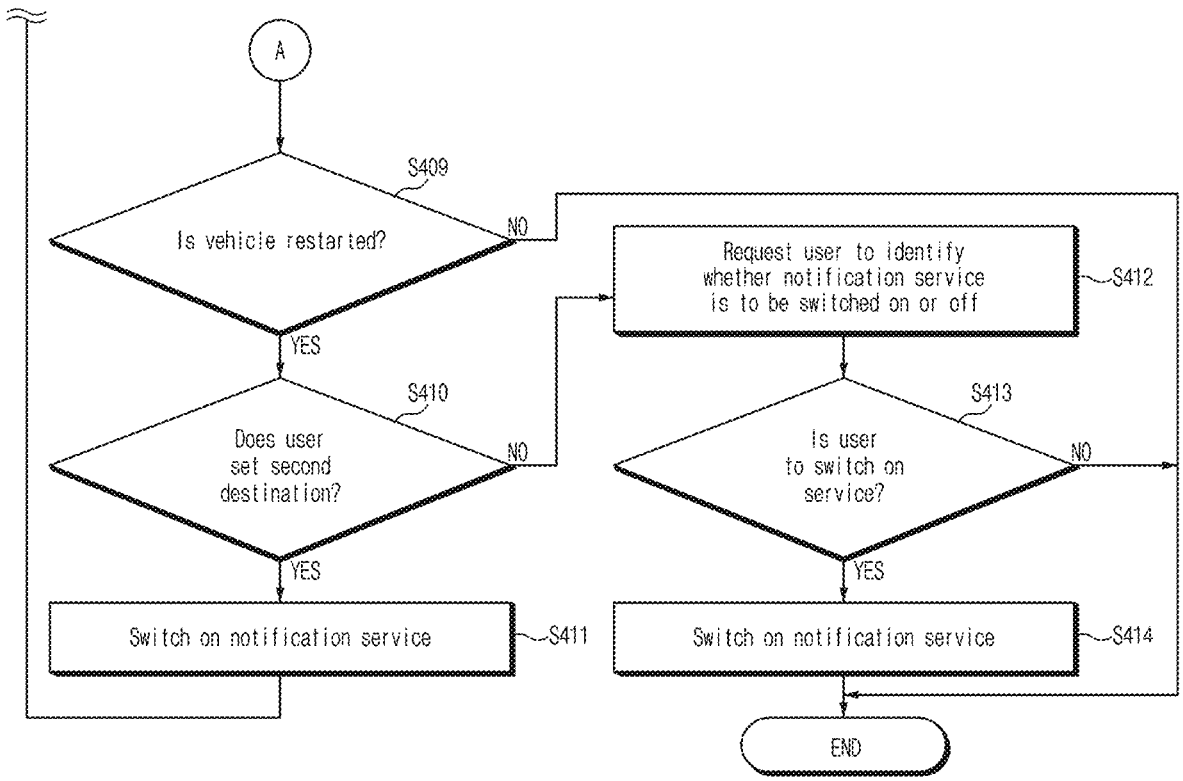

FIGS. 4A and 4B illustrate a flowchart illustrating a process of controlling on/off of a vehicle state notification service, based on area information, by an apparatus for controlling on/off of a vehicle state notification service according to an embodiment of the present disclosure.

Referring to FIG. 4, the apparatus 100 for controlling on/off of a vehicle state notification service may switch on a notification service of a vehicle (S401).

The apparatus 100 for controlling on/off of a vehicle state notification service may receive a destination from a user (S402) after switching on the notification service of the vehicle (S401).

As an example, the apparatus 100 for controlling on/off of a vehicle state notification service may receive the destination from the user through the AVN or navigation system.

The apparatus 100 for controlling on/off of a vehicle state notification service may identify whether the destination corresponds to an area, in which a notification service is unnecessary (S403), after receiving the destination from the user (S402).

As an example, the apparatus 100 for controlling on/off of a vehicle state notification service may recognize information on the area, in which the notification service is unnecessary, through a map DB included in the navigation system. The apparatus 100 for controlling on/off of a vehicle state notification service may compare the destination with the area, in which the notification service is unnecessary to identify whether the destination corresponds to the area, in which the notification service is unnecessary.

The apparatus 100 for controlling on/off of a vehicle state notification service may identify whether the destination corresponds to the area, in which the notification service is unnecessary (S403). The apparatus 100 for controlling on/off of a vehicle state notification service may inform the user that the notification service is automatically switched off after the vehicle reaches the destination when identifying that the destination corresponds to the area, in which the notification service is unnecessary (S404).

As an example, the apparatus 100 for controlling on/off of a vehicle state notification service may inform the user that the notification service is automatically switched off after the vehicle reaches the destination by providing a popup indicating that the notification service is automatically switched off after the vehicle reaches the selected destination through the AVN or cluster of the vehicle.

The apparatus 100 for controlling on/off of a vehicle state notification service may identify whether the destination corresponds to the area, in which the notification service is unnecessary (S403). The apparatus 100 for controlling on/off of a vehicle state notification service may identify that the vehicle reaches the destination when identifying that the destination does not correspond to the area, in which the notification service is unnecessary (S405).

As an example, the apparatus 100 for controlling on/off of a vehicle state notification service may identify that the vehicle reaches the destination through the AVN or navigation system of the vehicle.

The apparatus 100 for controlling on/off of a vehicle state notification service may identify that the vehicle reaches the destination (S405) after informing the user that the notification service is automatically switched off after the vehicle reaches the destination (S404).

The apparatus 100 for controlling on/off of a vehicle state notification service may identify whether the location of the vehicle corresponds to the area, in which a notification service is unnecessary (S406), after identifying that the vehicle reaches the destination (S405).

As an example, the apparatus 100 for controlling on/off of a vehicle state notification service may recognize information on the area, in which the notification service is unnecessary, through a map DB included in the navigation system. The apparatus 100 for controlling on/off of a vehicle state notification service may compare the location of the vehicle with the area, in which the notification service is unnecessary, to identify whether the location of the vehicle corresponds to the area, in which the notification service is unnecessary.

The apparatus 100 for controlling on/off of a vehicle state notification service may identify whether the location of the vehicle corresponds to the area, in which the notification service is unnecessary (S406). The apparatus 100 for controlling on/off of a vehicle state notification service may switch off the notification service when identifying that the location of the vehicle corresponds to the area, in which the notification service is unnecessary (S407).

An example, the apparatus 100 for controlling on/off of a vehicle state notification service may prevent an unnecessary notification by not providing a notification on the state of the vehicle to the user, when the location of the vehicle corresponds to the area, in which the notification service is unnecessary.

The apparatus 100 for controlling on/off of a vehicle state notification service may identify whether the location of the vehicle corresponds to the area, in which the notification service is unnecessary (S406). The apparatus 100 for controlling on/off of a vehicle state notification service may maintain the on state of the notification service when identifying that the location of the vehicle does not correspond to the area, in which the notification service is unnecessary (S408).

As an example, the apparatus 100 for controlling on/off of a vehicle state notification service may maintain the existing on state of the notification service to provide a notification on the state of the vehicle to the user if necessary, when the location of the vehicle does not correspond to the area, in which the notification service is unnecessary.

The apparatus 100 for controlling on/off of a vehicle state notification service may identify whether the vehicle is restarted (S409) after switching off the notification service of the vehicle (S407).

As an example, the apparatus 100 for controlling on/off of a vehicle state notification service may identify that the vehicle is restarted through the AVN or navigation system of the vehicle, the vehicle speed sensor, the GPS, and/or the like.

The apparatus 100 for controlling on/off of a vehicle state notification service may identify whether the vehicle is restarted (S409) after maintaining the on state of the notification service of the vehicle (S408).

The apparatus 100 for controlling on/off of a vehicle state notification service may identify whether the vehicle is restarted (S409) and may identify whether the user sets a second destination (S410) when identifying that the vehicle is restarted.

As an example, the apparatus 100 for controlling on/off of a vehicle state notification service may identify that the vehicle sets the second destination through the AVN or navigation system of the vehicle.

The apparatus 100 for controlling on/off of a vehicle state notification service may identify whether the user sets a second destination (S410) and may switch on the notification service when identifying that the user sets the second destination (S411).

As an example, when the user sets a second destination and restarts the vehicle after switching off the notification service as the location of the vehicle corresponds to the area, in which the notification service is unnecessary, the controller 120 may switch on the notification service, based on whether the second destination corresponds to the area, in which the notification service is unnecessary.

As an example, the apparatus 100 for controlling on/off of a vehicle state notification service may determine that the user intends to receive the notification service when the user selects the second destination when the user restarts the vehicle and may switch on the notification service.

The apparatus 100 for controlling on/off of a vehicle state notification service may identify whether the user sets the second destination (S410) and may request the user to identify whether the notification service is to be switched on or off when identifying that the user does not set the second destination (S412).

As an example, the apparatus 100 for controlling on/off of a vehicle state notification service may request the user to identify whether the notification service is to be switched on or off, through the AVN or navigation system.

The apparatus 100 for controlling on/off of a vehicle state notification service may perform operation S403 again after switching on the notification service of the vehicle (S411).

The apparatus 100 for controlling on/off of a vehicle state notification service may identify whether the user is to switch on the notification service (S413) after requesting the user to identify whether the notification service is to be switched on or off (S412).

As an example, the apparatus 100 for controlling on/off of a vehicle state notification service may identify that the user is to switch on the notification service, through the AVN or navigation system.

The apparatus 100 for controlling on/off of a vehicle state notification service may identify whether the user is to switch on the notification service (S413) and may switch on the notification service when identifying that the user is to switch on the notification service (S414).

As an example, when the vehicle is restarted while a second destination is not set as the notification service is switched off as the location of the vehicle corresponds to the area, in which the notification service is unnecessary, the controller 120 may switch on the notification service in correspondence to whether the notification service input from the user is to be switched on or off.

Figure 5:
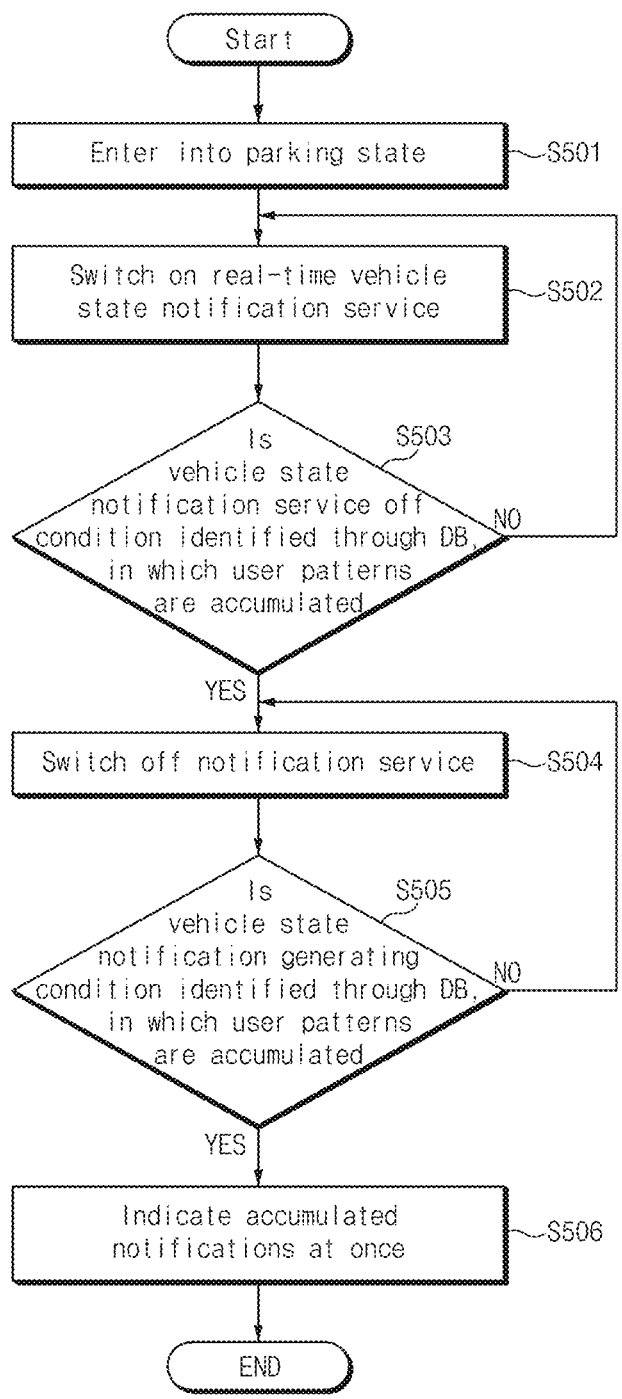
FIG. 5 is a flowchart illustrating a process of controlling on/off of a vehicle state notification service, based on a driving pattern, by an apparatus for controlling on/off of a vehicle state notification service according to an embodiment of the present disclosure.

FIG. 5 is a flowchart illustrating a process of controlling on/off of a vehicle state notification service, based on a driving pattern, by an apparatus for controlling on/off of a vehicle state notification service according to an embodiment of the present disclosure.

Referring to FIG. 5, the apparatus 100 for controlling on/off of a vehicle state notification service may identify that the vehicle enters into a parking state (S501).

As an example, the apparatus 100 for controlling on/off of a vehicle state notification service may identify whether the vehicle enters into the parking state, through at least one of a state of a transmission lever or a startup state of the vehicle.

The apparatus 100 for controlling on/off of a vehicle state notification service may switch on the real-time vehicle state notification service (S502) after identifying that the vehicle enters into the parking state (S501).

The apparatus 100 for controlling on/off of a vehicle state notification service may determine whether a vehicle state notification off condition is identified through the database (DB), in which user patterns are accumulated (S503), after switching on the real-time vehicle state notification service (S502).

As an example, the vehicle state notification service off condition may include a condition that is set based on commuting or returning-home of the user, which is recognized through data, in which the driving patterns of the user are accumulated.

As an example, the apparatus 100 for controlling on/off of a vehicle state notification service may identify the vehicle state notification service off condition including a weekday commuting condition that is estimated by analyzing the driving patterns, in which the vehicle is parked in the same area for a specific period of time on weekdays.

As an example, the apparatus 100 for controlling on/off of a vehicle state notification service may identify the vehicle state notification service off condition including a weekday returning-home condition that is estimated by analyzing the driving patterns, in which the vehicle is parked in the same area from the evening times to the following mornings.

As an example, the controller 120 may determine a first time point, at which the notification service is to be switched off, which satisfies the vehicle state notification service off condition, based on the location of the vehicle and the driving pattern.

The apparatus 100 for controlling on/off of a vehicle state notification service may determine whether the vehicle state notification service off condition is identified through the DB, in which the user patterns are accumulated (S503). The apparatus 100 for controlling on/off of a vehicle state notification service may perform operation S502 again when the vehicle state notification service off condition is not identified.

The apparatus 100 for controlling on/off of a vehicle state notification service may determine whether the vehicle state notification service off condition is identified through the DB, in which the user patterns are accumulated (S503). The apparatus 100 for controlling on/off of a vehicle state notification service may switch off the notification service when the vehicle state notification service off condition is identified (S504).

As an example, the controller 120 may switch off the notification service at a first time point, at which the notification service is to be switched off, which satisfies the vehicle state notification service off condition.

As an example, the apparatus 100 for controlling on/off of a vehicle state notification service may accumulate and store notifications instead of providing the notifications to the user while the notification service is off, after switching off the notification service.

The apparatus 100 for controlling on/off of a vehicle state notification service may determine whether a vehicle state notification generating condition is identified through the DB, in which the user patterns are accumulated (S505), after switching off the notification service (S504).

As an example, the vehicle state notification generating condition may include a condition that is set based on commuting or returning-home of the user, which is recognized through data, in which the driving patterns of the user are accumulated.

As an example, the apparatus 100 for controlling on/off of a vehicle state notification service may identify the vehicle state notification service off condition including a specific time point before a predicted driving (leaving-work) time point by analyzing the driving patterns, in which the vehicle is parked in the same area for a specific period of time on weekdays.

As an example, the apparatus 100 for controlling on/off of a vehicle state notification service may identify the vehicle state notification generating condition including the specific time point before the predicted driving (going-to-work) time point by analyzing the driving patterns, in which the vehicle is parked in the same area from evening times to following mornings.

As an example, the controller 120 may determine a second time point, at which the notifications accumulated while the notification service is off, which satisfies the vehicle state notification generating condition, are provided to at least one of the user or the server.

The apparatus 100 for controlling on/off of a vehicle state notification service may determine whether the vehicle state notification generating condition is identified through the DB, in which the user patterns are accumulated (S505) and may indicate the accumulated notifications at once when the vehicle state notification generating condition is identified (S506).

As an example, the apparatus 100 for controlling on/off of a vehicle state notification service may provide the accumulated notifications at once through the communication terminal including the smartphone of the user.

As an example, the controller 120 may provide the notifications accumulated while the notification service is off to at least one of the user or the server at the second time point that satisfies the vehicle state notification generating condition.

As an example, the apparatus 100 for controlling on/off of a vehicle state notification service may transmit the accumulated notifications to the communication terminal via the server.

As an example, the apparatus 100 for controlling on/off of a vehicle state notification service may indicate the accumulated notifications at once and switch on the notification service as well when the vehicle state notification generating condition is identified.

The apparatus 100 for controlling on/off of a vehicle state notification service may determine whether the vehicle state notification generating condition is identified through the DB, in which the user patterns are accumulated (S505). The apparatus 100 for controlling on/off of a vehicle state notification service may perform operation S504 again when the vehicle state notification generating condition is not identified (S506).

Figure 6:
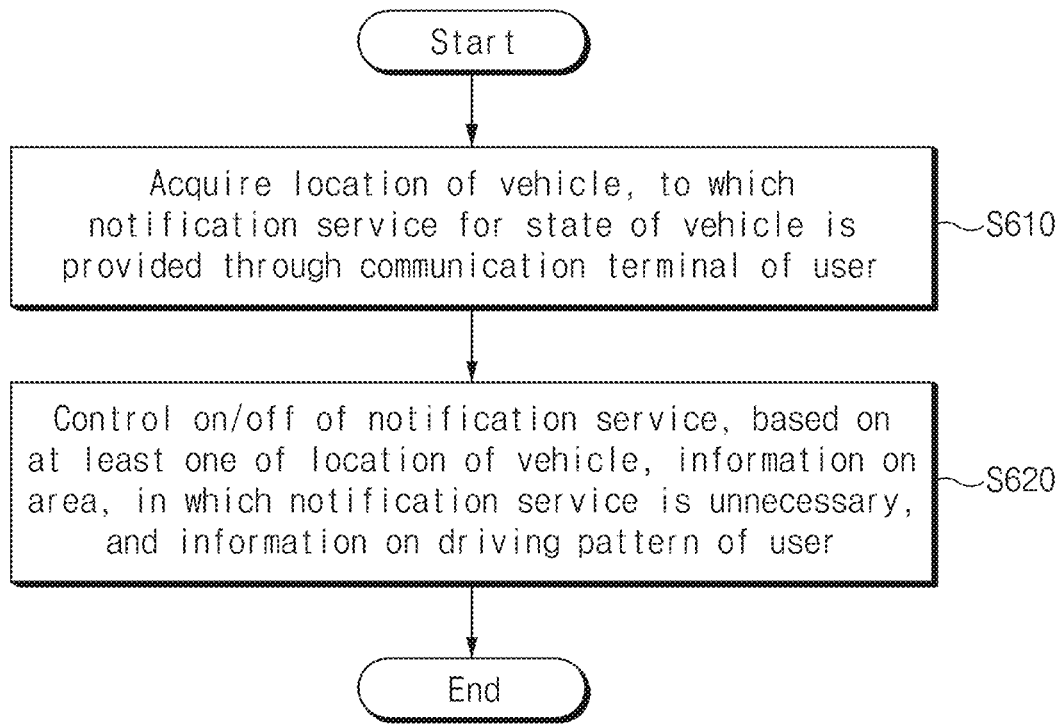
FIG. 6 is a flow chart illustrating a method for controlling on/off of a vehicle state notification service according to an embodiment of the present disclosure.

FIG. 6 is a flow chart illustrating a method for controlling on/off of a vehicle state notification service according to an embodiment of the present disclosure.

A method for controlling on/off of a vehicle state notification service may include an operation (S610) of acquiring a location of a vehicle, to which a notification service for a state of the vehicle is provided through a communication terminal of a user. The method for controlling on/off of a vehicle state notification service may also include an operation (S620) of controlling on/off of the notification service, based on at least one of the location of the vehicle, information on an area, in which the notification service is unnecessary, or information on a driving pattern of a user.

The operation (S610) of acquiring a location of a vehicle, to which a notification service for a state of the vehicle is provided through a communication terminal of a user may include an operation of acquiring the location of the vehicle, through the GPS included in the sensor 110.

The method for controlling on/off of a vehicle state notification service may further include an operation of inputting a destination of the vehicle and an operation of notifying the user that the notification service is automatically switched off after the vehicle reaches the destination when the destination corresponds to an area, in which preset notification service is unnecessary.

As an example, the operation of inputting a destination of the vehicle may include an operation of inputting the destination of the vehicle through the AVN or navigation system of the vehicle.

As an example, the operation of notifying the user that the notification service is automatically switched off after the vehicle reaches the destination may include an operation of informing the user that the notification service is automatically switched after the vehicle reaches the destination, through the AVN or cluster of the vehicle.

The operation (S620) of controlling on/off of the notification service, based on at least one of the location of the vehicle, information on an area, in which the notification service is unnecessary, or information on a driving pattern of a user may include switching off the notification service when the location of the vehicle corresponds to the area, in which the notification service is unnecessary, after the vehicle reaches the destination.

The method for controlling on/off of a vehicle state notification service may further include an operation of switching on the notification service based on whether a second destination corresponds to the area, in which the notification service is unnecessary. The operation of switching on the notification service is performed when the user sets the second destination and restarts the vehicle, after switching off the notification service as the location of the vehicle corresponds to the area, in which the notification service is unnecessary.

The method for controlling on/off of a vehicle state notification service may further include an operation of switching on the notification service in correspondence to whether the notification service input from the user is to be switched on or off. The operation of switching on the notification service is performed when the user does not set the second destination and restarts the vehicle, after switching off the notification service as the location of the vehicle corresponds to the area, in which the notification service is unnecessary.

As an example, an operation of switching on the notification service in correspondence to whether the notification service input from the user is to be switched on or off may include an operation of requesting the user to identify whether the notification service is to be switched on or off, through the AVN or navigation system.

The operation (S620) of controlling on/off of the notification service, based on at least one of the location of the vehicle, information on an area, in which the notification service is unnecessary, or information on a driving pattern of a user may include an operation of determining a first time point, at which the notification service is to be switched off, based on the location of the vehicle and the driving pattern, and switching off the notification service at the first time point. The operation (S620) may also include an operation of determining a second time point, at which notifications accumulated while the notification service is off are to be provided to at least one of the user and the server, based on the location of the vehicle or the driving pattern, and providing the notifications accumulated while the notification service is off to the user at the second time point As an example, the operation of determining a first time point, at which the notification service is to be switched off, based on the location of the vehicle and the driving pattern may include an operation of recognizing and analyzing the driving patterns through the map DB included in the AVN or navigation system of the vehicle.

As an example, the operation of determining a second time point, at which notifications accumulated while the notification service is off are to be provided, based on the location of the vehicle and the driving patterns may include an operation of recognizing and analyzing the driving patterns through the map DB included in the AVN or navigation system of the vehicle.

The operation of recognizing and analyzing the driving patterns through the map DB included in the AVN or navigation system of the vehicle may include an operation of determining at least one of the first time point, at which the notification service is to be switched off, or the second time point, at which notifications accumulated while the notification service is off are to be provided, based on a commuting or returning-home condition of the user, which is determined according to the location of the vehicle and the driving patterns.

The effects of the apparatus for controlling on/off of a vehicle state notification service, the system including the same, and the method thereof according to the present disclosure are described as follows.

At least one of the embodiments of the present disclosure provides an apparatus for improving usability by classifying an area, in which a notification service is unnecessary, according to attributes of notification information to prevent generation of an unnecessary notification in advance. At least one of the embodiments of the present disclosure also provides a system including the same and a method thereof.

Further, at least one of the embodiments of the present disclosure may provide an apparatus for preventing inconveniences due to a notification generated unintentionally by analyzing a driving pattern of a user, estimating a proper notification indication time point and a proper condition, and providing notification information accumulated at the proper notification indication time point. At least one of the embodiments of the present disclosure also provides a system including the same and a method thereof.

Furthermore, at least one of the embodiments of the present disclosure may provide an apparatus for preventing disputes between a customer and a repair service provider due to indication of impact information, idling information, and the like of a vehicle, which are generated during a repair operation for the vehicle. At least one of the embodiments of the present disclosure also provides a system including the same and a method thereof.

Further, at least one of the embodiments of the present disclosure may provide an apparatus for preventing disputes between a customer and a parking service provider due to indication of a notification of detection of an impact, which are generated while a parking elevator moves after a vehicle is parked in a parking tower. At least one of the embodiments of the present disclosure also provides a system including the same and a method thereof.

In addition, the present disclosure may provide various effects that are directly or indirectly recognized.

The above description is a simple exemplification of the technical spirit of the present disclosure. The present disclosure may be variously corrected and modified by those having ordinary skill in the art to which the present disclosure pertains without departing from the essential features of the present disclosure.

Therefore, the disclosed embodiments of the present disclosure do not limit the technical spirit of the present disclosure but are illustrative. The scope of the technical spirit of the present disclosure is not limited by the embodiments of the present disclosure. The scope of the present disclosure should be construed by the claims and it should be understood that all the technical spirits within the equivalent range are fall within the scope of the present disclosure.

What is claimed is:

1. An apparatus for controlling on/off of a vehicle state notification service, the apparatus comprising:
    a sensor configured to acquire a location of a vehicle, to which a notification service for a state of the vehicle is provided through a communication terminal of a user; and
    a controller configured to control on/off of the notification service, based on at least one of the location of the vehicle, information on an area, in which the notification service is unnecessary, and information on a driving pattern of the user.

2. The apparatus of claim 1, further comprising:
    an input device, to which a destination of the vehicle is input,
    wherein the controller notifies the user that the notification service is automatically switched off after the vehicle reaches the destination when the destination corresponds to an area, in which preset notification service is unnecessary.

3. The apparatus of claim 2, wherein the area, in which the notification service is unnecessary, is at least one of a vehicle repair shop or a parking tower, and
wherein the notification service includes at least one of a notification of idling, a notification of detection of an impact, a notification of a passenger on a rear seat, or a notification of opening of a door.

4. The apparatus of claim 2, wherein the controller switches off the notification service when the location of the vehicle corresponding to the area, in which the notification service is unnecessary, after the vehicle reaches the destination.

5. The apparatus of claim 1, further comprising:
a communication device configured to perform communication with a server,
wherein the controller transmits a notification indicating that notification service is switched off to the server through the communication device when the notification service is switched off.

6. The apparatus of claim 4, wherein the controller switches on the notification service, based on whether a second destination corresponds to the area, in which the notification service is necessary, when the user sets the second destination and restarts the vehicle, after switching off the notification service as the location of the vehicle corresponds to the area, in which the notification service is unnecessary.

7. The apparatus of claim 4, wherein the controller switches on the notification service in correspondence to whether the notification service input from the user is to be switched on or off when the user does not set a second destination and restarts the vehicle, after switching off the notification service as the location of the vehicle corresponds to the area, in which the notification service is unnecessary.

8. The apparatus of claim 1, wherein the controller determines a first time point, at which the notification service is to be switched off, based on the location of the vehicle and the driving pattern, and switches off the notification service at the first time point.

9. The apparatus of claim 8, wherein the controller determines a second time point, at which notifications accumulated while the notification service is off are to be provided to at least one of the user and a server, based on the location of the vehicle and the driving pattern, and provides the notifications accumulated while the notification service is off to the at least one of the user or the server at the second time point.

10. The apparatus of claim 9, wherein the controller determines at least one of the first time point and the second time point, based on a commuting or returning-home condition of the user, which is determined according to the location of the vehicle and the driving pattern.

11. The apparatus of claim 1, wherein the controller switches off the notification service, based on a condition for activating a valet parking mode of the vehicle, and provides notifications accumulated while the notification service is off to at least one of the user and a server, based on a condition for releasing the valet parking mode of the vehicle.

12. The apparatus of claim 9, wherein the controller determines a situation, in which a driver waits for a customer, based on a condition, in which the vehicle stands by in an idling state in a specific area, which is determined according to the location of the vehicle and the driving pattern, and switches off the notification service of notifying the driver of idling of the vehicle.

13. A system for controlling on/off of a vehicle state notification service, the system comprising:
a server configured to receive a state of a vehicle that provides a notification service from the vehicle, and transmit a notification on the state of the vehicle to a communication terminal of a user; and
an apparatus for controlling on/off of the notification service, the apparatus being configured to acquire a location of the vehicle, and control on/off of the notification service, based on at least one of the location of the vehicle, information on an area, in which the notification service is unnecessary, or information on a driving pattern of the user.

14. The system of claim 13, wherein the apparatus for controlling on/off of the vehicle state notification service switches off the notification service and transmits a notification indicating that the notification service is switched off, to the server, when the location of the vehicle corresponds to the area, in which the notification service is unnecessary, and
wherein the server transmits the notification indicating that the notification service is switched off, to the communication terminal.

15. A method for controlling on/off of a vehicle state notification service, the method comprising:
acquiring a location of a vehicle, to which a notification service for a state of the vehicle is provided through a communication terminal of a user; and
controlling on/off of the notification service, based on at least one of the location of the vehicle, information on an area, in which the notification service is unnecessary, and information on a driving pattern of the user.

16. The method of claim 15, further comprising:
inputting a destination of the vehicle; and
notifying the user that the notification service is automatically switched off after the vehicle reaches the destination when the destination corresponds to an area, in which preset notification service is unnecessary.

17. The method of claim 16, wherein the controlling on/off of the notification service, based on at least one of the location of the vehicle, information on the area, in which the notification is unnecessary, or information on the driving pattern of the user includes:
switching off the notification service when the location of the vehicle corresponding to the area, in which the notification service is unnecessary, after the vehicle reaches the destination.

18. The method of claim 17, further comprising:
switching on the notification service based on whether a second destination corresponds to the area, in which the notification service is necessary, when the user sets the second destination and restarts the vehicle, after switching off the notification service as the location of the vehicle corresponds to the area, in which the notification service is unnecessary; and
switching on the notification service in correspondence to whether the notification service input from the user is to be switched on or off when the user does not set the second destination and restarts the vehicle, after switching off the notification service as the location of the vehicle corresponds to the area, in which the notification service is unnecessary.

19. The method of claim 15, wherein the controlling on/off of the notification service, based on at least one of the location of the vehicle, information on the area, in which the notification service is unnecessary, and information on the driving pattern of the user includes:
  determining a first time point, at which the notification service is to be switched off, based on the location of the vehicle and the driving pattern, and switching off the notification service at the first time point; and
  determining a second time point, at which notifications accumulated while the notification service is off are to be provided, based on the location of the vehicle and the driving pattern, and providing the notifications accumulated while the notification service is off to the user at the second time point.

20. The method of claim 19, wherein the determining of the first time point, at which the notification service is to be switched off, based on the location of the vehicle and the driving pattern, and switching off the notification service at the first time point includes:
  determining the first time point, based on a commuting or returning-home condition of the user, which is determined according to the location of the vehicle and the driving pattern, and
  wherein the determining of the second time point, at which the notifications accumulated while the notification service is off are to be provided, based on the location of the vehicle and the driving pattern, and providing the notifications accumulated while the notification service is off to the user at the second time point includes:
  determining the second time point, based on the commuting or returning-home condition of the user, which is determined according to the location of the vehicle and the driving pattern.

* * * * *